S. E. BRADDOCK.
EGG SEPARATOR.
APPLICATION FILED SEPT. 14, 1921.

1,407,371.
Patented Feb. 21, 1922.

Inventor:
Sarah E. Braddock.
By Chandlee & Chandlee
Attorneys.

UNITED STATES PATENT OFFICE.

SARAH E. BRADDOCK, OF BROOKLYN, NEW YORK.

EGG SEPARATOR.

1,407,371. Specification of Letters Patent. Patented Feb. 21, 1922.

Application filed September 14, 1921. Serial No. 500,627.

*To all whom it may concern:*

Be it known that I, SARAH E. BRADDOCK, a citizen of the United States, residing at Brooklyn, in the county of Kings, State of New York, have invented certain new and useful Improvements in Egg Separators; and I do hereby declare the following to be a full, clear, and exact description of the invention, such as will enable others skilled in the art to which it appertains to make and use the same.

This invention relates to new and useful improvements in kitchen utensils and particularly to egg separators.

One object of the invention is to provide a device of this character which is simple in construction, formed from few parts, and which can be manufactured at a low cost.

Another object is to provide a device of this character wherein the yolk of the egg can be withdrawn from the white, to permit the white to pass into a receptacle, the yolk being retained and prevented from mixing with the white.

Other objects and advantages will be apparent from the following description when taken in connection with the accompanying drawing.

Figure 1:
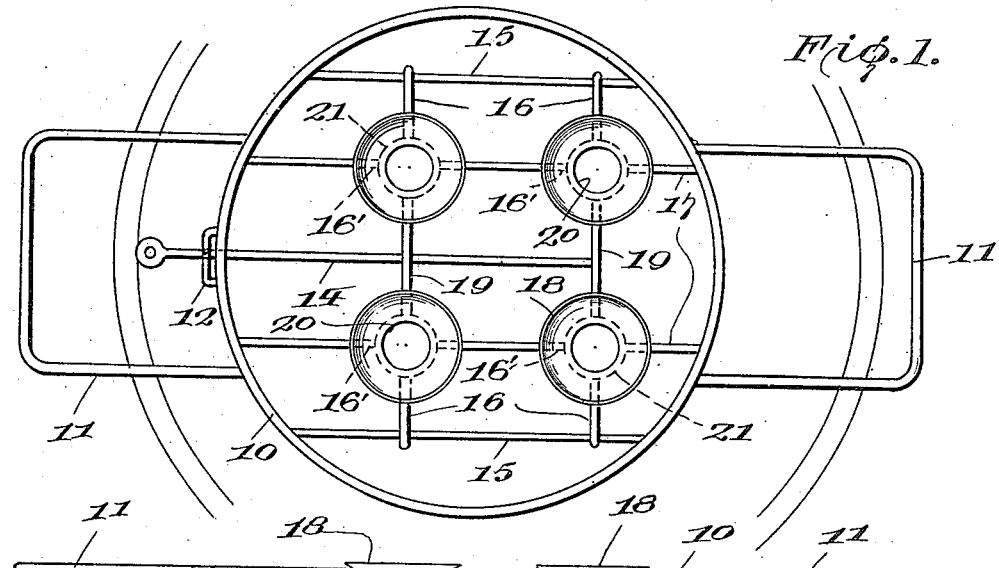
Figure 1 is a top plan view of an egg separator made in accordance with the invention.
Figure 2:
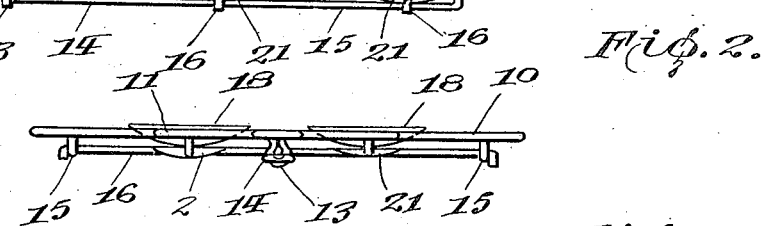
Figure 2 is a side elevation of the same.
Figure 3:
Figure 3 is an end view of the same.
Figure 4:
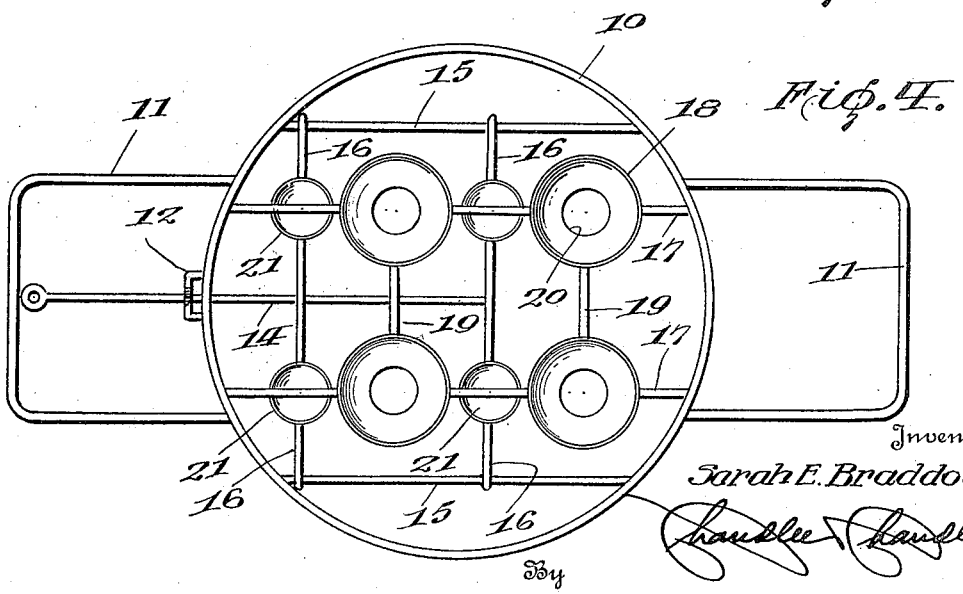
Figure 4 is a view similar to Figure 2, showing the yolk carrying members withdrawn from beneath the egg receiving receptacles or cups.

Referring particularly to the accompanying drawing, 10 represents a large wire ring having the loops 11 secured to its diametrically opposite sides, said loops being arranged to rest on the edge of a bowl to support the ring in proper position thereover. Also secured to one side of the ring 10, within one of the loops 11, and extending away from the ring, in a horizontal plane, is a smaller loop 12, the intermediate portion of which is formed with an eye 13 for the slidable reception of the operating rod 14. This rod also slides beneath the adjacent side of the ring 10. Carried by the ring 10, at points intermediate the loops 11, and at dimetrically opposite positions thereof, in depending relation to the ring, are the angular yokes 15, which serve as supporting guides for the ends of the cross wires 16, which wires have their ends looped or coiled around the connecting portions of the yokes 15. The rod 14 is secured to the intermediate portions of the cross wires 16, and is adapted to move the cross wires along the guides. Secured to the ring 10, at points within the loops 11, and extending diametrically across the ring, are the parallel wires 17, to which are secured the cups 18, cross connecting wires 19 extending between said cups to hold them in proper spaced relation. Each of the cups 18 has a central opening 20, in its lower end, of a size sufficient to permit the yolk of the egg to readily pass therethrough.

Secured to the wires 16, at their points of intersection with the longitudinal wires 16′, are the small cups 21, each being of a size to hold, only, the egg yolk, each cup being disposed directly beneath the opening 20 of a cup 18.

In the operation of the device, the same is placed across the top of a bowl, as seen in Figure 1, with the loops 11 resting on the edge of the bowl. The small cups are positioned beneath the larger cups 18, by properly manipulating the rod 14. An egg is then broken into each of the cups 18. The yolk of each egg will fall through the opening 20 of the cup, into the smaller cup 21, the white overflowing the same into the bowl. The rod 14 is then grasped and the smaller cups pulled from beneath the cups 18, when the remainder of the white will drip into the bowl. The entire device is then lifted from the bowl, and the same tilted to permit the yolks to be deposited in another receptacle for use separate from that of the whites of the eggs.

What is claimed is:

An egg separator comprising a ring, oppositely extending bowl engaging loops on the ring, depending yolks on the ring, a stationary frame carried by the ring, a plurality of egg receiving cups carried by the stationary frame and each having an opening in its lower end, a slidable frame mounted on the depending yolks, beneath the cups, a rod for moving the slidable frame, and smaller cups carried by the slidable frame for positioning beneath the first-named cups to receive the yolks from eggs broken into the first cups, and movement from beneath the first cups to permit the whites of the eggs to fall into a receptacle, while the yolks remain in the smaller cups, In testimony whereof, I affix my signature, in the presence of two witnesses.

SARAH E. BRADDOCK.

Witnesses:
 CHAILLE S. PREY,
 JAMES WILLIAMS.